United States Patent
Goebels et al.

(10) Patent No.: US 10,202,129 B2
(45) Date of Patent: Feb. 12, 2019

(54) BELLOWS, E.G. OF A GANGWAY BETWEEN TWO ARTICULATELY CONNECTED VEHICLES

(71) Applicant: Hübner GmbH & Co. KG, Kassel (DE)

(72) Inventors: Andre Goebels, Kassel (DE); Volker Jünke, Felsberg (DE)

(73) Assignee: Hübner GmbH & Co. KG, Kassel (DE)

( * ) Notice: Subject to any disclaimer, the term of this patent is extended or adjusted under 35 U.S.C. 154(b) by 344 days.

(21) Appl. No.: 15/084,641

(22) Filed: Mar. 30, 2016

(65) Prior Publication Data

US 2016/0288804 A1    Oct. 6, 2016

(30) Foreign Application Priority Data

| Apr. 2, 2015 | (DE) | 20 2015 002 559 U |
| Apr. 25, 2015 | (DE) | 20 2015 003 056 U |
| Jul. 29, 2015 | (EP) | 15178796 |
| Aug. 6, 2015 | (EP) | 15180000 |
| Aug. 26, 2015 | (EP) | 15182472 |

(51) Int. Cl.
  *B61D 17/22*    (2006.01)
  *B60D 5/00*    (2006.01)
  *B64F 1/305*    (2006.01)

(52) U.S. Cl.
  CPC ............ *B61D 17/22* (2013.01); *B60D 5/003* (2013.01); *B64F 1/305* (2013.01)

(58) Field of Classification Search
  CPC ................... B61D 17/20; B61D 17/22; B60D 5/00–5/006; B64F 1/305; B62D 47/025
  USPC ....................................................... 105/15–18
  See application file for complete search history.

(56) References Cited

U.S. PATENT DOCUMENTS

| 5,060,578 A | * | 10/1991 | Carimentrand | ........ | B61D 3/181 |
| | | | | | 105/18 |
| 5,111,752 A | * | 5/1992 | Carimentrand | ........ | B61D 3/181 |
| | | | | | 105/18 |
| 5,267,368 A | * | 12/1993 | Saunders | ................ | B64F 1/305 |
| | | | | | 135/132 |
| 7,322,298 B2 | * | 1/2008 | Petit | ...................... | B60D 5/006 |
| | | | | | 105/8.1 |
| 7,392,748 B2 | * | 7/2008 | De Antonio | .......... | B61D 17/22 |
| | | | | | 105/8.1 |
| 8,230,791 B2 | * | 7/2012 | Goebels | ................ | B61D 17/22 |
| | | | | | 105/15 |
| 8,297,197 B2 | * | 10/2012 | Tabellini | ................ | B61D 17/22 |
| | | | | | 105/20 |
| 8,485,108 B2 | * | 7/2013 | Tabellini | ................ | B60D 5/003 |
| | | | | | 105/20 |

(Continued)

FOREIGN PATENT DOCUMENTS

| DE | 4322098 A1 | 1/1995 | |
| DE | 4412888 A1 * | 10/1995 | ............ B60D 5/003 |

(Continued)

*Primary Examiner* — Zachary L Kuhfuss
(74) *Attorney, Agent, or Firm* — Dinsmore & Shohl LLP

(57) ABSTRACT

A bellows of a gangway between two articulately connected vehicles, of a canopy roof of an air passenger stair or a bridge or of a gangway into a building, comprises several successively arranged frames and all the frames are divided, preferably in a plane, on two opposite sides, thus forming several bellows parts.

22 Claims, 4 Drawing Sheets

(56) References Cited

U.S. PATENT DOCUMENTS

| | | | |
|---|---|---|---|
| 9,278,593 B1* | 3/2016 | Piacsek | B60D 5/00 |
| 9,889,863 B2* | 2/2018 | Mosaner | B61D 17/22 |
| 2005/0183622 A1* | 8/2005 | Petit | B60D 5/006 |
| | | | 105/8.1 |
| 2007/0175355 A1* | 8/2007 | Mosaner | B60D 5/003 |
| | | | 105/18 |
| 2011/0253002 A1* | 10/2011 | Sun | B61D 17/02 |
| | | | 105/15 |
| 2014/0191494 A1* | 7/2014 | Junke | B61D 17/22 |
| | | | 280/403 |
| 2016/0121910 A1* | 5/2016 | Smith | B60D 5/003 |
| | | | 105/15 |

FOREIGN PATENT DOCUMENTS

| | | | | |
|---|---|---|---|---|
| EP | 0631890 A1 * | 1/1995 | | B60D 5/003 |
| EP | 3061632 A1 * | 8/2016 | | B60D 5/003 |

* cited by examiner

BELLOWS, E.G. OF A GANGWAY BETWEEN TWO ARTICULATELY CONNECTED VEHICLES

CROSS-REFERENCE TO RELATED APPLICATIONS

This application claims priority of German patent application DE 20 2015 002 559.5 filed Apr. 2, 2015, German patent application DE 20 2015 003 056.4 filed Apr. 25, 2015, European patent application EP 15 178 796.7 filed Jul. 29, 2015, European patent application EP 15 180 000.0 filed Aug. 6, 2015 and European patent application EP 15 182 472.9 filed Aug. 26, 2015.

FIELD OF THE INVENTION

The invention relates to a bellows, e.g. of a gangway between two articulately connected vehicles, of a canopy roof of an air passenger stair or bridge or of a gangway into a building, wherein the bellows comprises several successively arranged frames.

BACKGROUND OF THE INVENTION

A bellows of the afore-mentioned type is known from road vehicles, rail-bound vehicles and air passenger stairs or bridges. A bellows serving as a protective element between two building parts or into a building part is also known.

In road vehicles, for example in an articulated bus, the bellows of the gangway usually encloses a platform and the articulation, whereas in rail-bound vehicles, e.g. tramways or high-speed trains, the bellows encloses a platform or a bridge as a gangway device. In particular in high-speed trains, the gangway often includes one bellow mounted within another, i.e. an outer bellows and an inner bellows.

Rail vehicles, such as the TGV, are known to have individual carriages mounted on so-called Jacobs bogies in the area of the gangway. It is also known that bellows may be worn out relatively quickly depending on the material used. Because the carriages are mounted on Jacobs bogies in the TGV, separating the carriages for replacing the bellows can only be done with considerable effort. On the other hand, the gangway between two carriages is not directly connected to the carriages, but is connected to the respective carriage by a tunnel-like passage. The bellows to be replaced have a tunnel-like passage or tunnel-like intermediate space with a smaller cross-section than the bellows. This means that a replacement of the bellows can only take place if the carriages, between which the bellows to be replaced are located, are actually taken down from the Jacobs bogie.

Also, there are bellows of gangways between rail vehicles, which are very big, for example bellows of gangways of double-decker carriages.

The bellows of air passenger bridges or stairs are often more than three meters in height and very broad. Transporting such bellows is thus complicated. The same is true with regard to bellows between two building parts or into a building part.

SUMMARY OF THE INVENTION

This invention simplifies the replacement of the bellows, in particular in a TGV. Moreover, this invention makes it easier to transport larger bellows in a space-saving manner.

According to the invention, the problem is solved by dividing all the frames of the bellows, preferably in a plane, on two opposite sides, thus forming several bellows parts. This means that the frames are designed so that they are divided in the area of their respective lateral wall, advantageously in one plane, i.e. that all the frames are divided at the same height. In a box-shaped circumferential bellows, each frame forms two frame parts; in a cross-sectionally U-shaped bellows, three frame parts are formed. The idea underlying the invention is thus to fold the bellows parts of the bellows in the area of the separation, in order to be able, during a refurbishment of the TGV, to transport the bellows as a whole through the tunnel-like intermediate space between the carriage and the place of installation of the bellows. As stated earlier, the tunnel-like passage has a lesser cross-section than the outer cross-section of the bellows itself. In this context, it is furthermore provided that the length of the separation of the frames, i.e. of the gap between the front sides of the bellows in the area of the separation, i.e. the length of the separation section is such that the two bellows parts can be folded on top of each other. In the folded state, the bellows may be transported in a space-saving manner, particularly in the case of large bellows, e.g. of air passenger bridges. In the case of a bellows of a canopy roof of an air passenger bridge, the height of the separation of the legs in a lateral wall can be different from that of the opposite lateral wall. This is the case with bellows of air passenger bridges that have legs of unequal lengths. In this respect, the legs may be folded on top of each other not only toward the front but also laterally.

It has proven to be particularly advantageous if the separation of the frames in the area of their bottom third reaches up to half the height of the respective lateral wall, depending on the size of the bellows. As a consequence, the bottom third, respectively the half of the bellows can be folded onto the upper part of the bellows, so that the bellows can now be brought easily through the tunnel-like intermediate space to the place of installation, or transported by truck in a space-saving manner. In another variation, the legs may be divided in a U-shaped bellows so that the two leg parts fold laterally.

According to another feature of the invention, the frame parts in the area of the separation of the frames may be connectable with each other by means of transition profiles. The transition profiles may be provided for increasing the stability in the area of the separation after the installation of the bellows and the profiles bridge the gap between the ends of the two frame parts to provide stability. The transition profiles may be connected to the frame parts by gluing, riveting or screwing.

In particular, it is provided that the bellows frames of the bellows comprise the separation. The fastening frames may be not divided, since they are already located at the front side of the vehicle, of the air passenger bridge, stair or of the building, and thus do not need to be replaced. Bellows of gangways, specifically in carriages for transporting vehicles, such as used for passing under the English Channel, in which the bellows are attached to the front side of the vehicle by screw-on frames, are also known. These screw-on frames remain on the bellows and are divided in the same way as a conventional bellows frame. If the bellows consists of two bellows halves, the coupling frames between the bellows halves may be separated from the bellows. As stated earlier, the bottom part of the bellows in the area of the bellows frame may be entirely folded onto the upper part of the bellows. However, it is essential that the folds or corrugations may be designed so as to be continuous in the area of the separation of the bellows frames. This means that the folds or corrugations, made of the reinforcing material coated with an elastomer, bridge the separation of the frames in the area of the separation of the frames. This does not hinder the folding movement of the bottom part of the bellows onto the upper part of the bellows, since the corrugations or fold are highly elastic. Since the folds or corrugations are continuous, i.e. continue in the area of the separation, there is no problem with regard to penetration of moisture.

In addition, the bellows may have a half corrugation, i.e. half a corrugation or half a fold, in the transition to the fastening frame, said half corrugation including a beading at its end. The beading is grasped by the fastening frame, the beading being designed as an elastomer profile. The beading can be pressed by the fastening frame, e.g. against the front wall of the gangway of the vehicle or of the air passenger bridge or stair, so that the interior space is sealed against penetration of moisture.

Furthermore, the fastening frame may comprise a cross-sectionally L-shaped recess for receiving the beading, the L-shaped recess being at least partially closeable by means of a clamping frame. Thus the beading is pressed not only e.g. against the front wall of the passage of the carriage body of the vehicle, but also against the L-shaped recess in the fastening frame. This ensures higher tightness against the ingress of moisture.

According to another aspect, the clamping frame itself can have a jaws-like opening for receiving a half corrugation of an interior corrugated bellows, which means that the gangway comprises a so-called double corrugated bellows, wherein the two bellows of the double corrugated bellows are mounted inside one another. Such a construction is used in particular in high-speed trains, in order to reduce pressure surges when traveling through tunnels or when two trains meet.

BRIEF DESCRIPTION OF THE DRAWINGS

In the following, the invention is exemplarily described in more detail by means of the drawings and based on the bellows of a gangway between two articulately connected vehicles. However, unless otherwise specified, the following explanations also apply correspondingly to bellows of air passenger bridges or stairs as well as bellows between buildings or into a building.

DETAILED DESCRIPTION OF THE PREFERRED EMBODIMENTS

Figure 1:
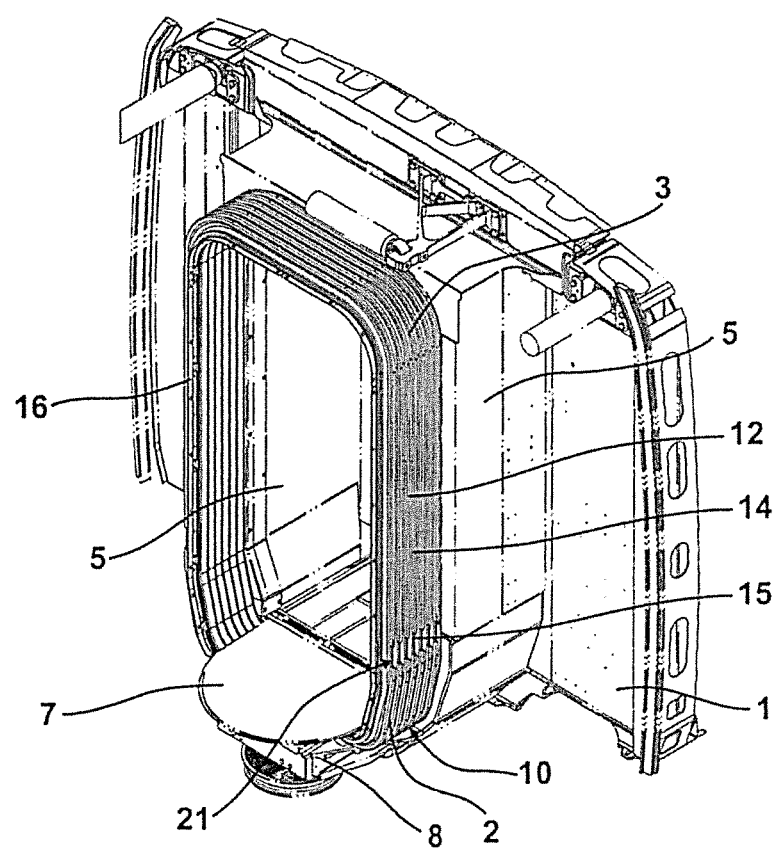
FIG. 1 is a perspective view of the double corrugated bellows as mounted in a vehicle.

According to FIG. 1, the vehicle is labelled 1. A tunnel-shaped passage 5 having a clear cross-section that is smaller than the outer cross-section of the bellows 10 is located between the actual vehicle, i.e. the carriage that receives the passengers, and the bellows 10. This means that the bellows 10 cannot be easily transported through the tunnel-shaped passage 5. The bellows 10 encloses the gangway device 7 formed as a platform, a rack 8, which serves to receive the Jacobs bogie, not shown, being located under the gangway device 7.

Figure 3:
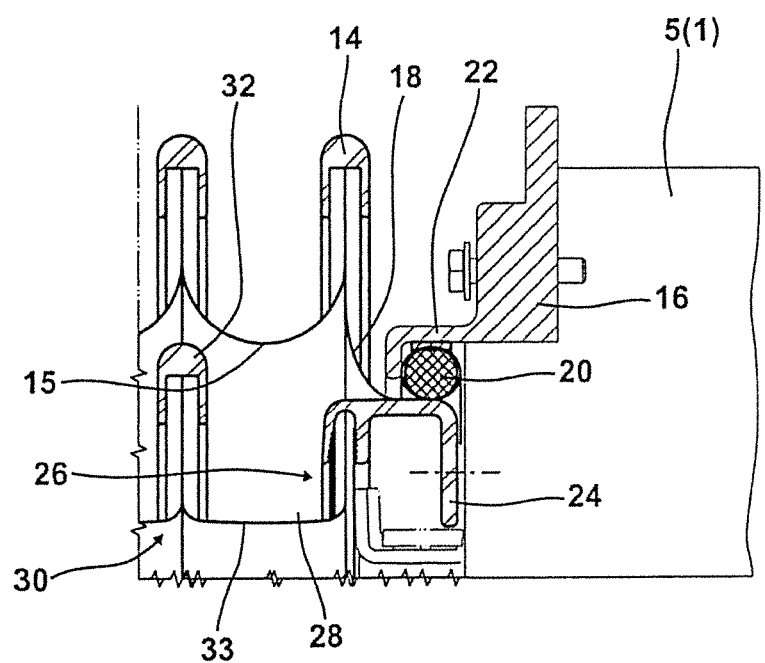
FIG. 3 is a schematic sectional view of the manner in which the double corrugated bellows is fastened to a vehicle.

The bellows 10 comprises bellows frames 14, which clamp strips 15 of a reinforcing material coated with an elastomer for forming the corrugations. As a consequence, the cross-section of the bellows frame 14 is U-shaped. At its end, the bellows 10 may be connected with the passage 5 of the carriage body of the vehicle 1 by means of the fastening frame 16 (FIG. 3). To this end, the bellows 10 has a half corrugation 18 in the transition to the fastening frame 16, said half corrugation 18 featuring the beading 20 at its end. The beading 20 is mounted in the L-shaped recess 22 of the fastening frame 16 and is pressed against the front sidewall of the passage 5. The clamping frame 24 comprises a jaws-like opening 26 for the half corrugation 28 of an inner corrugated bellows 30, wherein the clamping frame 24 also presses against the beading 20. Like the fastening frame 16, the clamping frame 24 is also screwed onto the front wall of the passage 5 (FIG. 3).

Figure 2:
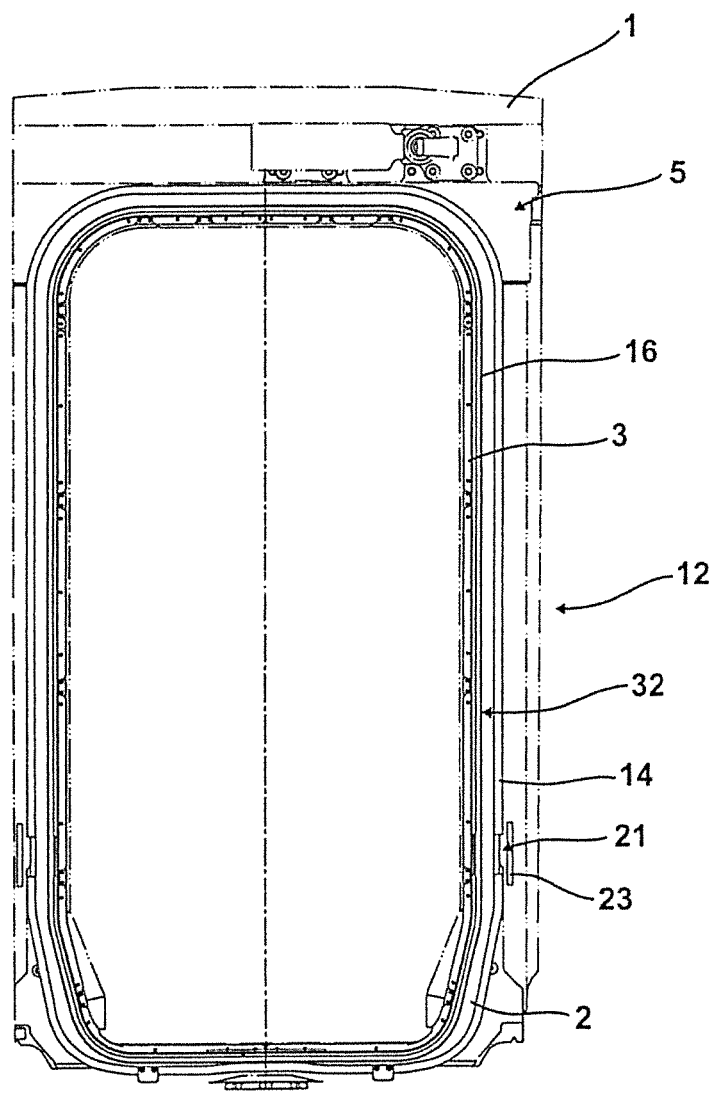
FIG. 2 is a front view onto the double corrugated bellows according to FIG. 1.

In the area of the lateral walls 12 of the bellows 10 serving as an outer corrugated bellows and of the bellows 30 serving as an inner corrugated bellows, the bellows frames 14, 32 of the two bellows are divided over a length of several cm thus forming the separation section 21. However, in this area, the corrugations of the inner and outer corrugated bellows, i.e. the strips 15, 33 made of the reinforcement coated with an elastomer, which forms the actual corrugation or a fold is designed so as to be continuous, so that the respective bellows is weakened in the area of the separation but nevertheless tight. This can be seen in more detail in FIG. 2 and FIG. 3, in which bellows frames 14 of the bellows 10 serving as the outer corrugated bellows and the bellows frames 32 of the inner corrugated bellows 30 are respectively divided at the lateral wall 12 thus forming the separation section 21. This way, two bellows parts 2, 3 are formed, which are foldable on top of each other, even though they are connected by the bellows material. After the installation, a transition profile 23 can be provided for stiffening the bellows frames 14, 32, said profile 23 being placed onto the ends of the bellows frames 14, 32 in the area of the separation section 21 and quasi bridging the separation section 21. The transition profile 23 may be fastened by riveting or clamping (not shown).

Figure 4:
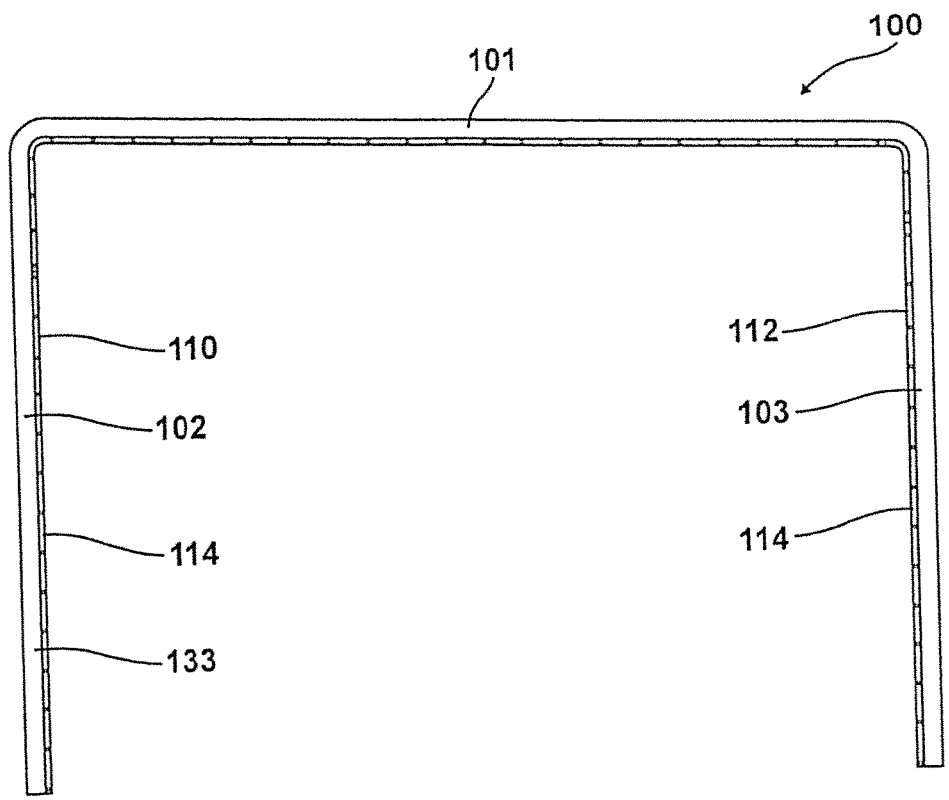
FIG. 4 is a schematic view of the bellows of a cross-sectionally U-shaped roof of an air passenger bridge or stair.
Figure 5:
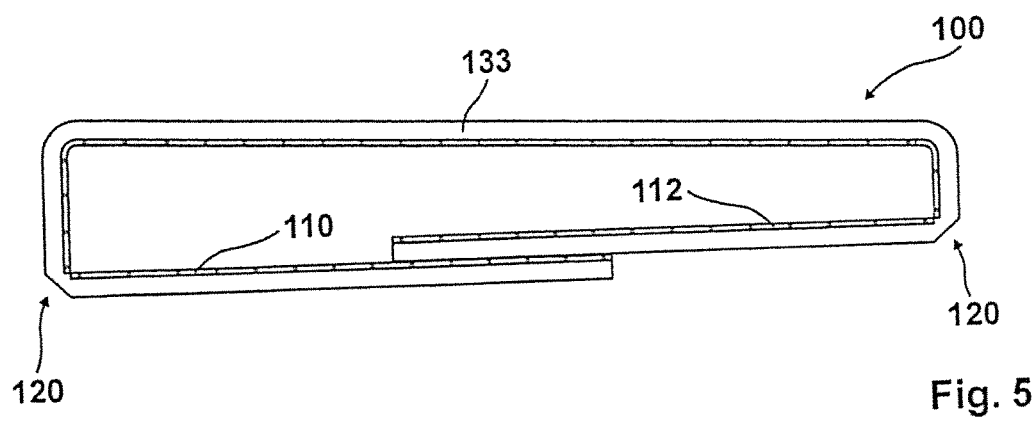
FIG. 5 shows the bellows according to FIG. 4, wherein the legs are folded on top of each other.

The bellows of the canopy roof of an air passenger bridge or stair is shown in FIGS. 4 and 5. The bellows 100 is cross-sectionally U-shaped, wherein the bellows frame 114 of the two legs 110, 112 is divided in the upper area of the legs and the lateral wall of the bellows, thus forming a total of three bellows parts 101, 102, 103, the bellows parts 102, 103 being folded on top of each other (FIG. 5). This means that the bellows parts 102, 103 are parts of the legs 110, 112 of the U-shaped bellows. The bellows frames 114 are disposed on the inner side of the bellows and connect the strips 133 made of the reinforcement coated with an elastomer, e.g. a woven fabric, the strips 133 forming the corrugations or folds. The corrugations or folds may be folded in the web portion of the individual corrugations or folds, for which reason, they form a flat portion 120 in the area of the fold.

LIST OF REFERENCE NUMBERS

1 Vehicle
2 Bellows part
3 Bellows part
5 Passage

7 Gangway device
8 Rack
10 Bellows (outer corrugated bellows)
12 Lateral wall
14 Bellows frame
15 Strips of a reinforcement coated with an elastomer for forming a corrugation
16 Fastening frame
18 Half corrugation
20 Beading
21 Separation section
22 Recess
23 Transition section
24 Clamping frame
26 Opening
28 Half corrugation
30 Inner corrugated bellows
32 Bellows frame
33 Strips of a reinforcement coated with an elastomer for forming a corrugation
100 Bellows
101 Bellows part
102 Bellows part
103 Bellows part
110 Leg
112 Leg
114 Bellows frame
120 Flat portion
133 Strips of a reinforcement coated with an elastomer for forming a corrugation

The invention claimed is:

1. A bellows assembly of a gangway between two articulately connected vehicles, a canopy roof of an air passenger stair or an air passenger bridge, or a gangway into a building comprising:
a plurality of successively arranged frames;
a plurality of strips of flexible material, at least one strip connecting each of the frames to an adjacent one of the frames so as to form a tunnel-shaped passage; and
each frame being divided into at least a first part and a second part by a first separation, the first separation defining a first folding area, the strips of flexible material flexibly interconnecting the first and second parts of the frames such that the bellows assembly is foldable at the first folding area for providing a more compact size, wherein the first part and the second part are spaced apart by a separation distance at the folding area such that the first and the second part are foldable on top of each other, the first and the second part being generally parallel to each other in a folded position.

2. A bellows assembly of claim 1, wherein the first and the second parts are foldable on top of each other towards a front of the bellows assembly.

3. A bellows assembly of claim 1, wherein the first and the second parts are laterally foldable on top of each other.

4. A bellows assembly of claim 1, wherein the frames having the separation in an area between bottom third up to half of a height of a lateral wall of the bellows.

5. A bellows assembly of claim 1, further comprising:
at least one transition profile operable to interconnect the first part of one of the frames to the second part.

6. A bellows assembly of claim 1, wherein the frames clamp the strips, the strips being made of a reinforcing material coated with an elastomer in order to form folds or corrugations of a folding or corrugated bellows.

7. A bellows assembly of claim 6, wherein the folds or corrugations are continuous in the area of the first separation of the frames.

8. A bellows assembly of claim 1, further comprising:
a fastening frame located at an end of the successively arranged frames for connecting the bellows with a carriage body of the vehicle, the air passenger stair, the bridge or the building.

9. A bellows assembly of claim 8, wherein the fastening frame is connected to the adjacent one of the frames by a half corrugation, the half corrugation having a beading at an end.

10. A bellows assembly of claim 9, wherein the beading is clampable by the fastening frame.

11. A bellows assembly of claim 10, further comprising:
a clamping frame, wherein the fastening frame has a cross-sectionally L-shaped recess for receiving the beading, and the L-shaped recess is at least partially closable by the clamping frame.

12. A bellows assembly of claim 11, wherein the clamping frame has a jaws-like opening for receiving a half corrugation of an inner bellows.

13. A bellows assembly of claim 1, wherein the first and the second part are both U-shaped.

14. A bellows assembly of claim 13, wherein each frame is divided along a plane at two different locations and the two different locations define the first separation.

15. A bellows assembly of claim 1, wherein:
the frame is further divided into the first part, the second part and a third part;
the second and third part being divided by a second separation, the second separation defining a second folding area; and
the strips of flexible material flexibly interconnecting the second and third parts such that the bellows assembly is foldable at the second folding area for providing a more compact size.

16. A bellows assembly of claim 15, wherein each frame is U-shaped.

17. A bellows assembly of claim 16, wherein each frame is divided along a plane at two different locations and the two different locations defining the first and the second separation.

18. A bellows assembly of a gangway between two articulately connected vehicles, a canopy roof of an air passenger stair or an air passenger bridge, or a gangway into a building comprising:
a plurality of successively arranged frames;
a plurality of strips of flexible material, at least one strip connecting each of the frames to an adjacent one of the frames so as to form a tunnel-shaped passage;
each frame being divided into at least a first part and a second part by a first separation, the first separation defining a first folding area, the strips of flexible material flexibly interconnecting the first and second parts of the frames such that the first part of the bellows assembly is foldable with respect to the second part at the first folding area for providing a more compact size, the first and the second part being generally parallel to each other in a folded position; and
at least one transition profile operable to interconnect the first part of one of the frames to the second part.

19. A bellows assembly of claim 18, wherein the first part and the second part are spaced apart by a separation distance at the folding area such that the first and the second part are foldable on top of each other.

20. A bellows assembly of claim 18, wherein the first and the second parts are foldable on top of each other towards a front of the bellows assembly.

21. A bellows assembly of a gangway between two articulately connected vehicles, a canopy roof of an air passenger stair or an air passenger bridge, or a gangway into a building comprising:

a plurality of successively arranged U-shaped frames;

a plurality of strips of flexible material, at least one strip connecting each of the frames to an adjacent one of the frames so as to form a tunnel-shaped passage; and each frame comprising two legs, each leg having an upper portion and a lower portion being divided by a separation, the separation defining a folding area, the strips of flexible material flexibly interconnecting the upper portion and lower portion of the each leg such that the lower portion of each leg of the frame is foldable at the respective folding area on top of the lower portion of the other leg of the frame.

22. A bellows assembly of a gangway between two articulately connected vehicles, a canopy roof of an air passenger stair or an air passenger bridge, or a gangway into a building comprising:

a plurality of successively arranged U-shaped frames;

a plurality of strips of flexible material, at least one strip connecting each of the frames to an adjacent one of the frames so as to form a tunnel-shaped passage; and each frame comprising two legs, each leg having an upper portion and a lower portion being divided by a separation, the separation defining a folding area, the strips of flexible material flexibly interconnecting the upper portion and lower portion of the each leg such that the lower portion of each leg of the frame is foldable at the respective folding area, the two lower portions of the legs folding laterally.

\* \* \* \* \*